Dec. 22, 1925.  1,566,395
G. H. GILMAN
DRILLING MACHINE
Filed March 13, 1923
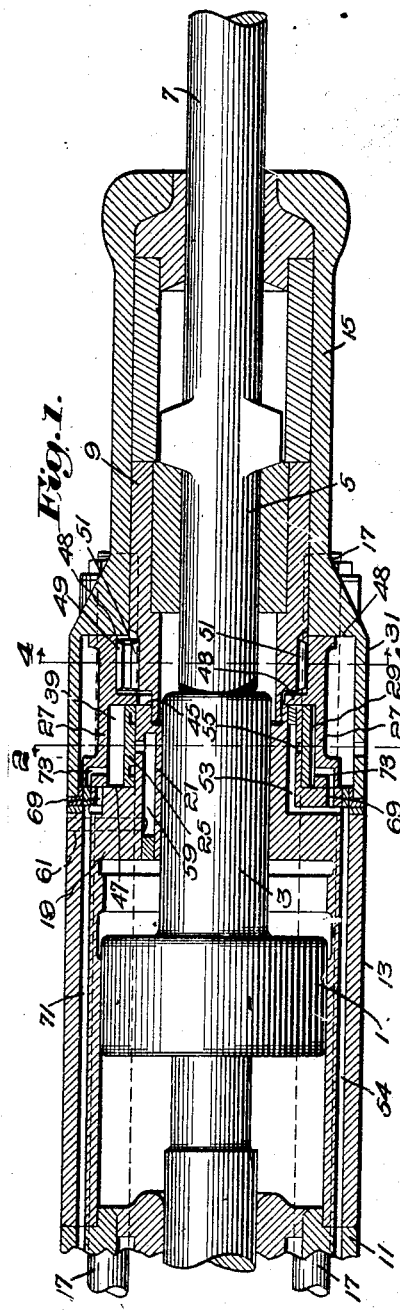
Inventor:
George H. Gilman,
by Emery Booth Janney & Varney Attys Patented Dec. 22, 1925.

1,566,395

UNITED STATES PATENT OFFICE.

GEORGE H. GILMAN, OF BELMONT, MASSACHUSETTS.

DRILLING MACHINE.

Application filed March 13, 1923. Serial No. 624,844.

*To all whom it may concern:*

Be it known that I, GEORGE H. GILMAN, a citizen of the United States, and a resident of Belmont, county of Middlesex, and State of Massachusetts, have invented an Improvement in Drilling Machines, of which the following description, in connection with the accompanying drawings, is a specification, like characters on the drawings representing like parts.

My invention relates to fluid pressure motors and gearing and particularly but not exclusively to a rock drill having a motor and gearing for rotating the chuck.

My invention will be best understood from the following description when read in the light of the accompanying drawings showing one specific embodiment of my invention selected for illustrative purposes, while the scope of my invention will be more particularly pointed out in the appended claims.

In the drawings:—

Fig. 1 shows a longitudinal section of the forward portion of a hammer rock drill embodying my invention;

Fig. 2 is a section on the line 2—2 of Fig. 1;

Fig. 3 is a section on the line 3—3 of Fig. 2;

Fig. 4 is a section on the line 4—4 of Fig. 1; and

Figs. 5 and 6 are sections on the lines 5—5 and 6—6 of Fig. 2 with parts omitted.

Referring to the drawings and to the preferred embodiment of my invention I have shown a rock drill provided with a reciprocatory piston 1 having the forward extension 3 which at the end of the forward stroke of the piston strikes the rear end of the shank 5 of the drill steel 7, the shank being carried by the sectional chuck 9 in such manner that when the chuck rotates the drill steel must rotate with it.

As indicated in Fig. 1 the casing of the rock drill includes a rear cylinder section 11, a forward cylinder section 13 and a chuck housing 15, the piston being mounted for reciprocation in the cylinder sections and the chuck for rotation in the chuck housing. The chuck housing and the cylinder sections as will be understood by those skilled in the art are held in assembled relation by means of the four through bolts 17.

As indicated in Fig. 1 the cylinder section 13 for the hammer piston has a front cylinder head 19 provided with a forward extension 21, the cylinder head and its extension being formed integrally with each other and with the cylinder section. As indicated in Fig. 2 the cylinder head extension 21 exteriorly is of substantially square cross section. Surrounding this extension and slidably fitting the upper and lower flat faces 23 thereof is a substantially square ring 25, while surrounding the ring 25 is a second ring or yoke 27 which slidably fits the outside faces of the ring 25 at right angles to the faces 23 as is indicated at 29 in Fig. 2.

The rings 25 and 27 are surrounded by the enlarged rearward end portion 31 of the chuck housing 15, and supporting the outer ring or yoke 27 are the similarly arranged eccentrics 33 which as indicated by Fig. 3 are provided with trunnions 35 and 37 respectively rotatably mounted in the cylinder section 13 and the chuck housing 15. The eccentric mounting for the yoke permits the yoke to partake of a gyratory motion about the axis of the chuck, and referring to Fig. 2 the parts are so designed and arranged as to provide the upper and lower chambers 39 between the rings 25 and 27 and the side chambers 41 between the extension 21 and the ring 25.

As shown in Fig. 1 the yoke 27 intermediate its length is provided with an internal flange 43 which bears against the forward end of the ring 25 and the forward end face 45 of the extension 21 so as to close the chambers 39 and 41. At their rearward ends the rings 25 and yoke 27 bear against the end face 47 of the cylinder head 19 while at its forward end the yoke 27 bears against the surface 48 on the chuck housing 15. The portion of the yoke 27 forwardly of the annular flange 43 is circular as indicated in Fig. 4 and this portion is provided with the internal gear teeth 49 which mesh with the external gear teeth 51 on the chuck so that when the yoke is gyrated the chuck will be rotated, this construction forming a powerful reduction gear.

For causing gyration of the yoke 27 I alternately admit and exhaust motive fluid to and from the chambers 39 for causing the yoke to reciprocate relatively to the ring 25, and alternately admit and exhaust motive fluid to and from the chambers 41 for causing the ring 25 to reciprocate relatively to the extension 21.

For admitting motive fluid to the chambers 39 I form in the extension 21 the passage 53 which is connected with the live air intake (not shown) for the machine in any convenient manner as for example by way of a passage 54 shown in Fig. 1. Intersecting the passage 53 and opening on the lower face 23 of the extension 21 as viewed in Fig. 2 is the short passage 55. Cooperating with the port opening of the passage 55 are a pair of grooves 57 which as indicated by Figs. 2 and 6 are formed in the lower face of the ring 25 in contact with the lower surface 23 of the extension. As will be clear from Fig. 2 if the ring 25 is moved to the left the right hand groove 57 will be brought into registry with the port opening of the passage 55 which will supply motive fluid to the right hand chamber 41, while if on the other hand the ring 25 is moved to the right the left hand passage 57 will be brought into registry with the port opening of the passage 55 which will supply motive fluid to the left hand chamber 41.

For exhausting the motive fluid from the chambers 41 I provide in the extension 21 a passage 59 which is connected to the atmosphere in any convenient manner, as for example, by means of the intersecting passage 61 shown in Fig. 1. Intersecting the passage 59 and opening on the upper face 23 of the extension 21 is a passage 63. Cooperating with the port opening of the passage 63 are a pair of grooves 65 formed in the surface of the member 25 in contact with the upper face 23, the grooves 65 being arranged longitudinally of the ring and being intersected by transverse grooves 67 which lead towards the chambers 41. When the ring 25 is at the right hand limit of its travel as viewed in Fig. 2 the left hand groove 65 will be in registry with the passage 63, and consequently the right hand chamber 41 will be connected to the atmosphere. When the ring 25 is at the left hand limit of its travel the right hand groove 65 will be brought into registry with the passage 63, and consequently the left hand chamber 41 will be connected to the atmosphere.

For admitting motive fluid to the chambers 39 I provide passages 69 which open on the forward face 47 of the front cylinder head 19. The passages 69 may be supplied with motive fluid in any convenient manner, as for example, the upper one by means of the passage 71 shown in Fig. 1 and lower one by means of the passage 54 which supplies the passage 53 hereinbefore referred to. Cooperating with the port openings of the passages 69 I provide the yoke or ring 27 with passages 73 which lead from the chambers 39 to the surface of the yoke in contact with the face 47. As shown in Fig. 1 the lower passage 73 is in registry with the lower passage 69, and consequently the lower chamber 39 will be supplied with motive fluid, and when the yoke reaches the lower limit of its travel the upper passage 73 will be brought into registry with the upper passage 69 and consequently motive fluid will then be admitted to the upper chamber 39 for causing the yoke to be moved back to the position shown by Fig. 1.

For exhausting motive fluid from the upper chamber 39 I provide the upper end of the exterior right hand surface of the ring 25 with a notch 75 which is adapted to be moved into and out of registry with a passage 77 formed through the ring 27. At the lower end of the exterior left hand surface of the ring 25 I provide a similar notch 75 adapted to be moved into and out of registry with a similar port 77 formed in the yoke. The passages 77 open into the interior of the enlarged portion 31 of the chuck housing which is vented to the atmosphere by means of one or more ports 79. It will be noted that with the parts in the position shown by Fig. 1 the upper notch 75 and passages 77 and 79 place the upper chamber 39 in communication with the atmosphere, and that when the yoke has moved to the downward limit of its travel the lower chamber 39 then will be placed in communication with the atmosphere by means of the lower notch 75 and passages 77 and 79.

Generally stated the operation of my device is as follows:

In the position of parts shown by Fig. 2 motive fluid is admitted to the lower chamber 39 and is exhausted from the upper chamber 39. This will cause downward movement of the yoke relatively to the ring 25, causing the yoke to partake of its gyratory motion in doing which it contracts the left hand chamber 41, and when the yoke is at the right hand limit of its travel motive fluid is admitted to the left hand chamber 41 and exhausted from the right hand chamber 41 which causes the upper chamber 39 to be contracted. When the yoke is at the downward limit of its travel motive fluid is admitted to the upper chamber 39 and exhausted from the lower chamber 39 which causes further movement of the yoke causing the right hand chamber 41 to be contracted. Motive fluid is then admitted to the right hand chamber 41 and exhausted from the left hand chamber 41 which causes further movement and contracts the lower chamber 39 which moves the parts back to the position shown by Fig. 1. By suitably proportioning the ports and passages the air may act expansively in one of the chambers while it is being admitted to the next successive chamber supplied.

Although I have herein shown a chuck rotated by means of a motor and reduction gearing involving the use of a gyratory member directly geared to the chuck and forming part of the motor, other specifically different ways of rotating chucks, in which the gearing may be part of the motor or separate therefrom and involving the use of a gyratory member, form the subject matter of my copending applications Serial Nos. 350,577, 611,171, 611,976 and 624,845, respectively filed January 10, 1920, January 6. 1923, January 11, 1923 and March 13, 1923, claiming the generic invention more broadly than claimed herein.

Although I have described for purposes of illustration one specific embodiment of my invention it is to be understood that I am not limited thereby to its particular mechanical details, but that within the scope of my invention wide deviations may be made therefrom without departing from the spirit of my invention.

Claims.

1. In a drilling machine, a rotary chuck, an internal member mounted for reciprocation relatively to said chuck, an external member mounted on said internal member for reciprocation relatively thereto and transversely to the reciprocation of said internal member, means supporting said external member for gyration, a direct gearing connection between said external member and chuck, and means for causing motion of said members by fluid pressure.

2. In a drilling machine, a rotary chuck, an internal member mounted for reciprocation relatively to said chuck, an external member mounted on said internal member for reciprocation relatively thereto and transversely to the reciprocation of said internal member, means supporting said external member for gyration, external gear teeth carried by said chuck, internal gear teeth carried by said external member and meshing with said external gear teeth, and means for causing motion of said members by fluid pressure.

3. In a drilling machine, a rotary chuck, an internal member mounted for reciprocation relatively to said chuck, an external member mounted on said internal member for reciprocation relatively thereto and transversely to the reciprocation of said internal member, means supporting said external member for gyration, a flange carried by said external member, said flange surrounding said chuck and having internal gear teeth meshing with external gear teeth carried by said chuck, and means for causing motion of said members by fluid pressure.

4. In a drilling machine, a rotary chuck, a fluid pressure operated motor and reduction gearing comprising a yoke having an eccentric mounting for guiding it in an orbital path about the axis of said chuck, said yoke having a flange provided with internal gear teeth meshing with external gear teeth on said chuck, and means permitting motive fluid to act internally of said yoke for causing its orbital motion.

5. In a drilling machine, a rotary chuck, a fluid pressure operated motor and reduction gearing comprising a yoke having internal gear teeth in mesh with external gear teeth on said chuck, an eccentric mounting for said yoke, and means permitting motive fluid to act internally of said yoke for causing it to gyrate.

6. In a drilling machine, a rotary chuck, a fluid pressure operated motor and reduction gearing comprising a gyratory yoke directly geared to said chuck, and means permitting motive fluid to act internally of said yoke for gyrating it.

7. In a rock drill, a casing containing a hammer piston and a rotary chuck, said casing having a portion with oppositely disposed flat sides upon which a member surrounding said portion is mounted for reciprocation, said member having exterior flat sides disposed normally to the flat sides of said casing portion, a yoke mounted for gyration and having interior oppositely disposed flat sides resting upon the exterior flat sides of said member, intermeshing gear teeth carried by said chuck and said yoke, and means for causing motive fluid to act upon said member and said yoke for driving said chuck.

8. In a rock drill, a casing containing a hammer piston and a rotary chuck, said casing having a forwardly directed portion of polygonal exterior, a polygonal ring surrounding said forwardly directed portion and reciprocating thereon, a yoke mounted for gyration and surrounding said polygonal ring, said yoke being mounted upon said polygonal ring for relative reciprocation, a direct gearing connection between said yoke and chuck, and means for permitting motive fluid to act between said forwardly directed portion and polygonal ring and between the latter and said yoke for driving said chuck.

9. In a rock drill, a casing having mounted therein a hammer piston and a rotary chuck, said hammer piston having a forward extension, a fluid pressure operated motor and reduction gearing comprising a gyratory yoke adapted to surround said forward extension, a direct gearing connection between said yoke and chuck, and means permitting motive fluid to act interiorly of said yoke for driving said chuck.

10. In a rock drill, a hammer piston, a cylinder having a forward extension with oppositely disposed flat sides, a member mounted for reciprocation upon said flat sides, said member having oppositely disposed flat sides, a gyratory yoke mounted upon the flat sides of said member for reciprocation relatively thereto, a chuck, a direct gearing connection between said yoke and said chuck, and means including fluid pressure conducting ports and passages for causing motive fluid to act upon said yoke for operating it.

11. In a rock drill, a hammer piston, a cylinder having a forward extension with oppositely disposed flat sides, said hammer piston having a forward extension passing through the extension of said cylinder, a member mounted for reciprocation upon said flat sides, said member having oppositely disposed flat sides, a gyratory yoke mounted upon the flat sides of said member for reciprocation relatively thereto, a chuck, a direct gearing connection between said yoke and said chuck, and means including fluid pressure conducting ports and passages for causing motive fluid to act upon said yoke for operating it.

12. In a rock drill, a chuck, a drill steel carried by said chuck, a cylinder having a front head with a forward extension through which impact is transmitted to said drill steel, said forward extension having oppositely disposed flat sides, a member mounted for reciprocation upon said flat sides, said member having oppositely disposed exterior flat sides, a gyratory yoke mounted upon the flat sides of said member for reciprocation relatively thereto, a flange carried by said yoke and having internal gear teeth meshing with external gear teeth on said chuck, and means for admitting motive fluid between said extension and member and between said member and yoke for driving said chuck.

13. In a rock drill, a chuck, a drill steel carried by said chuck, a piston for operating said drill steel, a fluid pressure motor for driving said chuck, said motor comprising a pair of nested elements arranged substantially co-axially with said piston, and a direct gearing connection between the outer of said elements and said chuck.

14. In a rock drill, a chuck, a drill steel carried by said chuck, a piston for operating said drill steel, a fluid pressure motor for driving said chuck, said motor comprising a gyratory member mounted upon a plurality of independent eccentric members, connected for simultaneous rotation solely by said gyratory member, guiding means located internally of said gyratory member for preventing bodily rotation of said member, and means for causing said gyratory member to drive said chuck.

15. A combined motor and reduction gearing, comprising a driven element, a member mounted for gyration and having a direct gearing connection with said driven element, guiding means reciprocably connected to said member interiorly thereof, said guiding means being reciprocably connected to a stationary part, and means for causing said member to gyrate by the action of fluid pressure.

In testimony whereof, I have signed my name to this specification.

GEORGE H. GILMAN.